US009835242B2

(12) United States Patent
Itoo et al.

(10) Patent No.: US 9,835,242 B2
(45) Date of Patent: Dec. 5, 2017

(54) TRANSMISSION

(71) Applicant: KAWASAKI JUKOGYO KABUSHIKI KAISHA, Hyogo (JP)

(72) Inventors: Seiji Itoo, Akashi (JP); Ayumi Hamada, Akashi (JP); Taisuke Morita, Amagasaki (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 56 days.

(21) Appl. No.: 14/258,273

(22) Filed: Apr. 22, 2014

(65) Prior Publication Data
US 2015/0300481 A1 Oct. 22, 2015

(51) Int. Cl.
*F16H 57/04* (2010.01)
*F16H 57/038* (2012.01)
(Continued)

(52) U.S. Cl.
CPC ......... *F16H 57/0424* (2013.01); *F16D 11/14* (2013.01); *F16H 57/021* (2013.01); *F16H 57/038* (2013.01); *F16H 61/12* (2013.01); *F16D 11/10* (2013.01); *F16D 27/118* (2013.01); *F16D 2011/002* (2013.01); *F16H 2057/02052* (2013.01)

(58) Field of Classification Search
CPC ............ F16H 57/0421; F16H 57/0426; F16H 57/042; F16H 57/0424; F16H 57/04; F16H 57/038; F16H 57/021; F16H 57/0423; F16H 57/037; F16H 2057/02013; F16H 2057/02026; F16H 2057/02039; F16H 2057/02043; F16H 2057/02052; B60K 17/3462; B60K 17/346

USPC ... 74/405, 15.88, 15.86, 13, 14, 15.66, 15.6, 74/15.8
See application file for complete search history.

(56) References Cited

U.S. PATENT DOCUMENTS 4,738,152 A * 4/1988 Takimura ............. B60K 17/346
                                                    180/247
4,911,260 A * 3/1990 Miura ................ B60K 17/3462
                                                    180/248
(Continued)

FOREIGN PATENT DOCUMENTS

JP       2006-82662        3/2006
WO    WO 2015088415 A1 *  6/2015 ............. F16H 57/04

*Primary Examiner* — David M Fenstermacher
*Assistant Examiner* — Joseph Brown
(74) *Attorney, Agent, or Firm* — Wenderoth, Lind & Ponack, L.L.P.

(57) ABSTRACT

A vehicle-use transmission includes a transmission case accommodating a transmission mechanism; and a power extraction case linked to a side wall of the transmission case and accommodating a gear type power extraction mechanism linked to a power extraction shaft of the transmission mechanism. The power extraction case includes: a gear accommodation chamber for accommodating the gear type power extraction mechanism; and an intermediate transmission chamber for establishing fluid communication between the gear accommodation chamber and the inside of the transmission case. The power extraction case is provided with an oil communication passage for establishing fluid communication between the inside of the transmission case and the gear accommodation chamber.

8 Claims, 9 Drawing Sheets

(51) Int. Cl.
*F16H 57/021* (2012.01)
*F16D 11/14* (2006.01)
*F16H 61/12* (2010.01)
F16H 57/02 (2012.01)
F16D 11/10 (2006.01)
F16D 27/118 (2006.01)
F16D 11/00 (2006.01)

(56) References Cited

U.S. PATENT DOCUMENTS

| | | | | |
|---|---|---|---|---|
| 5,289,730 | A * | 3/1994 | Wilson | B60K 17/28 |
| | | | | 180/247 |
| 5,582,065 | A * | 12/1996 | Roth | A01B 71/066 |
| | | | | 74/15.69 |
| 6,962,226 | B2 * | 11/2005 | Goto | B60K 17/35 |
| | | | | 180/233 |
| 7,377,342 | B2 * | 5/2008 | Miyazaki | B60K 23/08 |
| | | | | 180/233 |
| 7,644,789 | B2 * | 1/2010 | Miyazaki | B60K 23/08 |
| | | | | 180/233 |
| 8,177,672 | B2 * | 5/2012 | Kato | B60K 17/344 |
| | | | | 475/198 |
| 8,328,668 | B2 * | 12/2012 | Ariga | F16H 57/0423 |
| | | | | 184/13.1 |
| 8,870,702 | B2 * | 10/2014 | Kii | B60K 23/08 |
| | | | | 475/199 |
| 2013/0145879 | A1 * | 6/2013 | Nakamura | F16H 57/042 |
| | | | | 74/467 |
| 2015/0192198 | A1 * | 7/2015 | Suzuki | B60K 17/35 |
| | | | | 180/233 |

* cited by examiner

TRANSMISSION

BACKGROUND OF THE INVENTION

1. Field of the Invention

The present invention relates to a vehicle-use transmission.

2. Description of the Related Art

In a transmission of a utility vehicle according to the conventional art, for example, as disclosed in Japanese Laid-Open Patent Publication No. 2006-82662, U.S. Pat. No. 7,377,342, and U.S. Pat. No. 7,644,789, oil in the inside of the transmission case is supplied to a gear accommodation chamber for accommodating a gear type power extraction mechanism linked to a power extraction shaft of a transmission mechanism so that oil supply to the gear type power extraction mechanism is achieved.

Here, when a bearing of the gear shaft or the like is arranged in the intermediate transmission chamber for establishing fluid communication between the gear accommodation chamber and the inside of the transmission case, a possibility of interference with the oil supply from the inside of the transmission case to the gear accommodation chamber is caused.

Thus, an object of the present invention is to provide a transmission in which oil can easily be supplied to a gear type power extraction mechanism in a gear accommodation chamber.

SUMMARY OF THE INVENTION

In order to achieve the above-mentioned object, the present invention is a vehicle-use transmission comprising:

a transmission case accommodating a transmission mechanism; and a power extraction case linked to a side wall of the transmission case and accommodating a gear type power extraction mechanism linked to a power extraction shaft of the transmission mechanism, wherein the power extraction case includes: a gear accommodation chamber for accommodating the gear type power extraction mechanism; and an intermediate transmission chamber for establishing fluid communication between the gear accommodation chamber and an inside of the transmission case, and wherein the power extraction case is provided with an oil communication passage for establishing fluid communication between the inside of the transmission case and the gear accommodation chamber.

According to the above-mentioned configuration, oil can easily be supplied through the oil communication passage to the gear type power extraction mechanism in the gear accommodation chamber.

Preferably, the present invention further employs the following configurations.

(1) The oil communication passage is formed in the power extraction case.

(2) A bearing of a power-upstream-side gear shaft of the gear type power extraction mechanism is arranged between the gear accommodation chamber and the intermediate transmission chamber.

(3) The gear type power extraction mechanism includes a bevel gear mechanism.

(4) In the intermediate transmission chamber, a switching mechanism is arranged for switching, between a connected state and a disconnected state, power transmission between the power extraction shaft and the gear type power extraction mechanism.

(5) In the above-mentioned configuration (4), the switching mechanism includes a two-wheel drive to four-wheel drive switching mechanism.

(6) In the inside of the transmission case, an oil passage is constructed from: a recess formed in an inner wall of the transmission case; and a rib protruding from the inner wall of the transmission case.

Further, the oil passage guides oil to an opening part of the oil communication passage in the inside of the transmission case.

(7) In the above-mentioned configuration (6), the opening part of the oil communication passage is provided in a bottom part of a front part in the inside of the transmission case.

Further, the recess and the rib are formed such that rear parts thereof are higher than front parts thereof.

According to the above-mentioned configuration (1), the oil communication passage can easily be formed.

According to the above-mentioned configuration (2), even when oil supply from the intermediate transmission chamber to the gear accommodation chamber is interfered by the bearing, oil can easily be supplied through the oil communication passage to the gear type power extraction mechanism in the gear accommodation chamber.

The above-mentioned configuration (3) provides a detailed configuration of the gear type power extraction mechanism. According to the present configuration, oil can easily be supplied to the bevel gear mechanism.

According to the above-mentioned configuration (4), switching of power transmission from the power extraction shaft is achieved by the switching mechanism.

The above-mentioned configuration (5) provides a detailed configuration of the switching mechanism. According to the present configuration, switching between two-wheel drive and four-wheel drive is achieved.

According to the above-mentioned configuration (6), the oil passage in the inside of the transmission case can easily be formed by the recess and the rib in the inner wall of the transmission case. Further, oil in the inside of the transmission case can be led to the oil communication passage so that the oil in the inside of the transmission case can easily be supplied through the oil communication passage to the gear type power extraction mechanism in the gear accommodation chamber.

According to the above-mentioned configuration (7), at the time of acceleration of the vehicle, oil is to move from the front part to the rear part due to the acceleration. However, the recess and the rib can suppress the rearward movement of the oil. As a result, even at the time of acceleration of the vehicle, the oil can easily stay in the opening part of the oil communication passage.

In summary, the present invention provides a transmission in which oil can easily be supplied to a gear type power extraction mechanism in a gear accommodation chamber.

DETAILED DESCRIPTION OF THE INVENTION

[Overall Structure of Vehicle]

Figure 1:
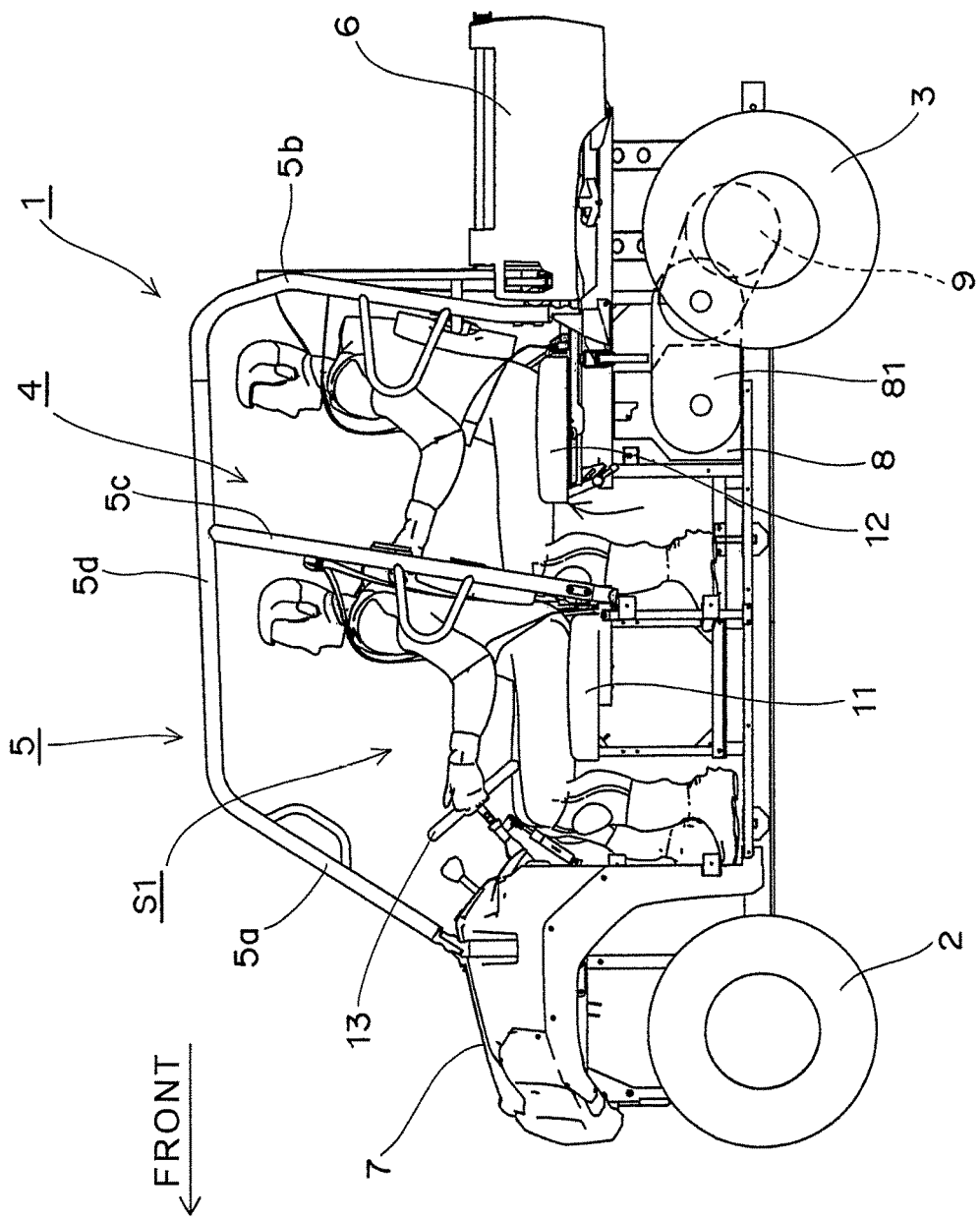
FIG. 1 is a left side view of a utility vehicle according to an embodiment of the present invention.
Figure 2:
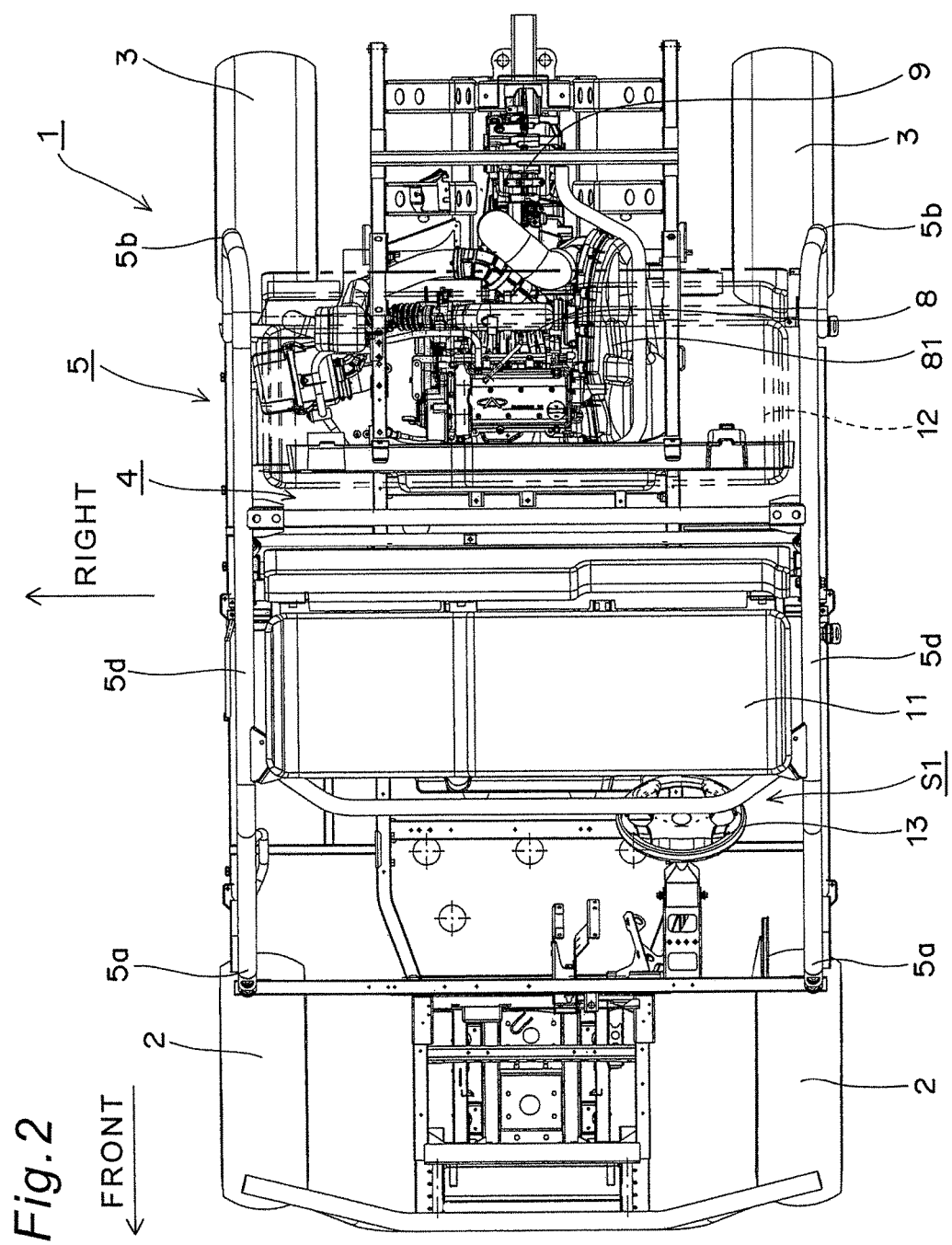
FIG. 2 is a top view of a utility vehicle shown in FIG. 1.

FIG. 1 is a left side view of a utility vehicle according to an embodiment of the present invention. Here, the notation of direction employed in the present embodiment is defined as the same as those viewed from a driver of the utility vehicle. FIG. 2 is a top view of the utility vehicle shown in FIG. 1.

As shown in FIGS. 1 and 2, in the utility vehicle 1, a pair of right and left front wheels 2 are provided in the front part of the vehicle body and a pair of right and left rear wheels 3 are provided in the rear part of the vehicle body. Further, a cabin space (a cabin) 4 is provided between the front wheels 2 and the rear wheels 3. The cabin space 4 is surrounded by a ROPS 5. The ROPS 5 is an abbreviation of a rollover protective structure, which constitutes a part of the vehicle body frame. Then, the ROPS 5 includes: a pair of right and left front vertical members 5a; a pair of right and left rear vertical members 5b; a pair of right and left intermediate vertical members 5c arranged between the front vertical members 5a and the rear vertical members 5b; and a plurality of upper end beam members 5d for linking the upper end parts of the individual vertical members 5a, 5b, and 5c. Then, a loading platform 6 is provided behind the cabin space 4 and a bonnet 7 is provided in front of the cabin space 4. A front sheet 11 of bench type is provided in the frontward half part of the cabin space 4 and a rear sheet 12 of bench type is provided in the rearward half part of the cabin space 4. A sheet region S1 in the left side part of the front sheet 11 is a driver's seat and an operation section, such as a steering wheel 13 is provided in front of the left-side sheet region S1.

An engine 8 is arranged under the rear sheet 12. Then, a transmission 9 for converting the driving force from the engine 8 and then transmitting it to the wheels is arranged behind the engine 8. The engine 8 and the transmission 9 are formed separately or integratedly with each other. Then, the driving force of the engine 8 is transmitted to the transmission 9 through a belt converter 81 attached to the left side surface of the engine 8 and the left side surface of the transmission 9. The belt converter 81 includes a V-belt type continuously variable transmission, where automatic transmission control is performed in accordance with the revolving speed of the engine 8 and an increase or decrease of the load on the wheel side.

[Structure of Transmission]

Figure 3:
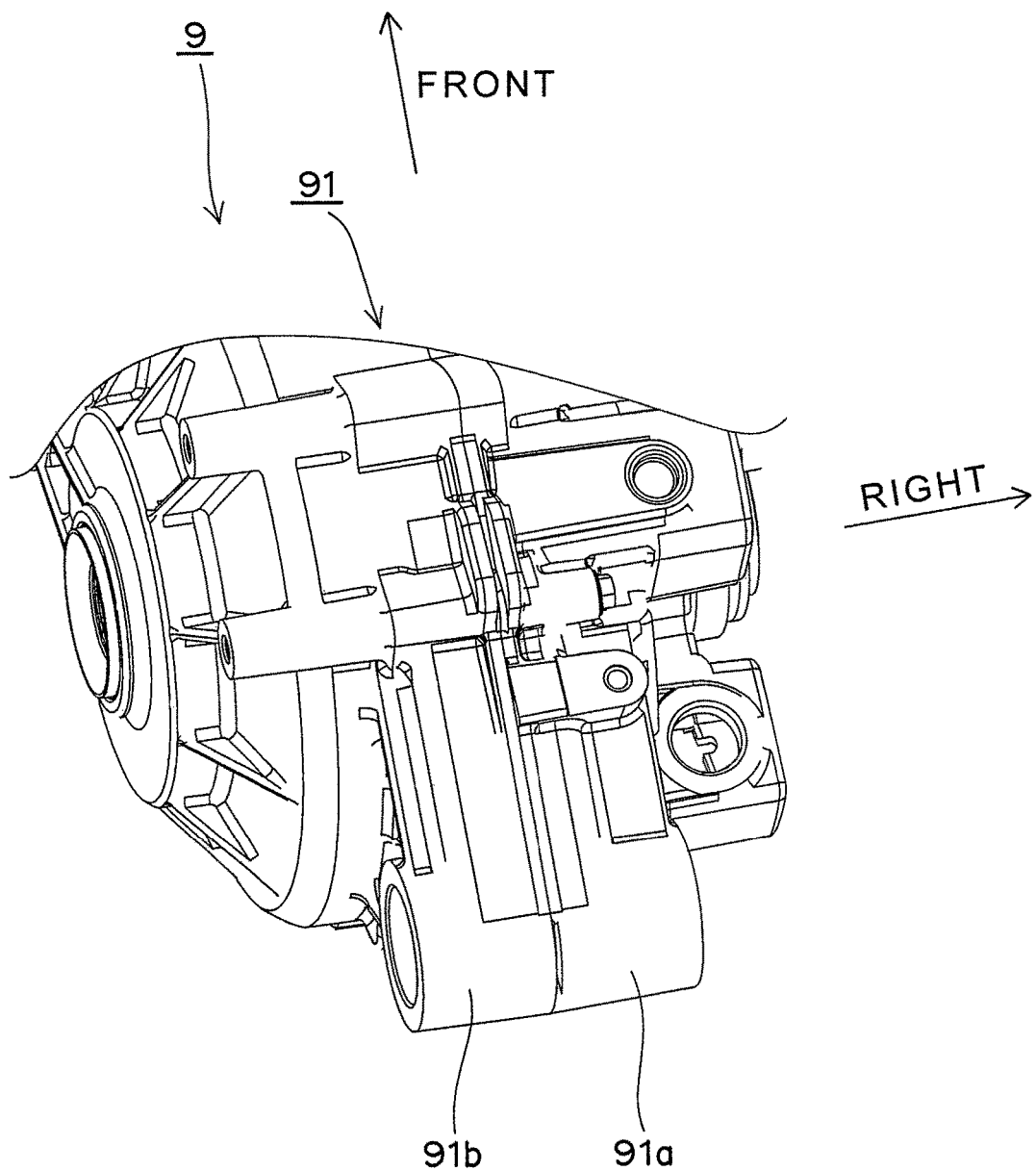
FIG. 3 is a rearward perspective view of a transmission.

FIG. 3 is a rearward perspective view of the transmission 9. As shown in FIG. 3, a transmission case 91 forming the outline of the transmission 9 is fabricated by joining a pair of left and right transmission case members 91a and 91b at the central mating surface.

Figure 4:
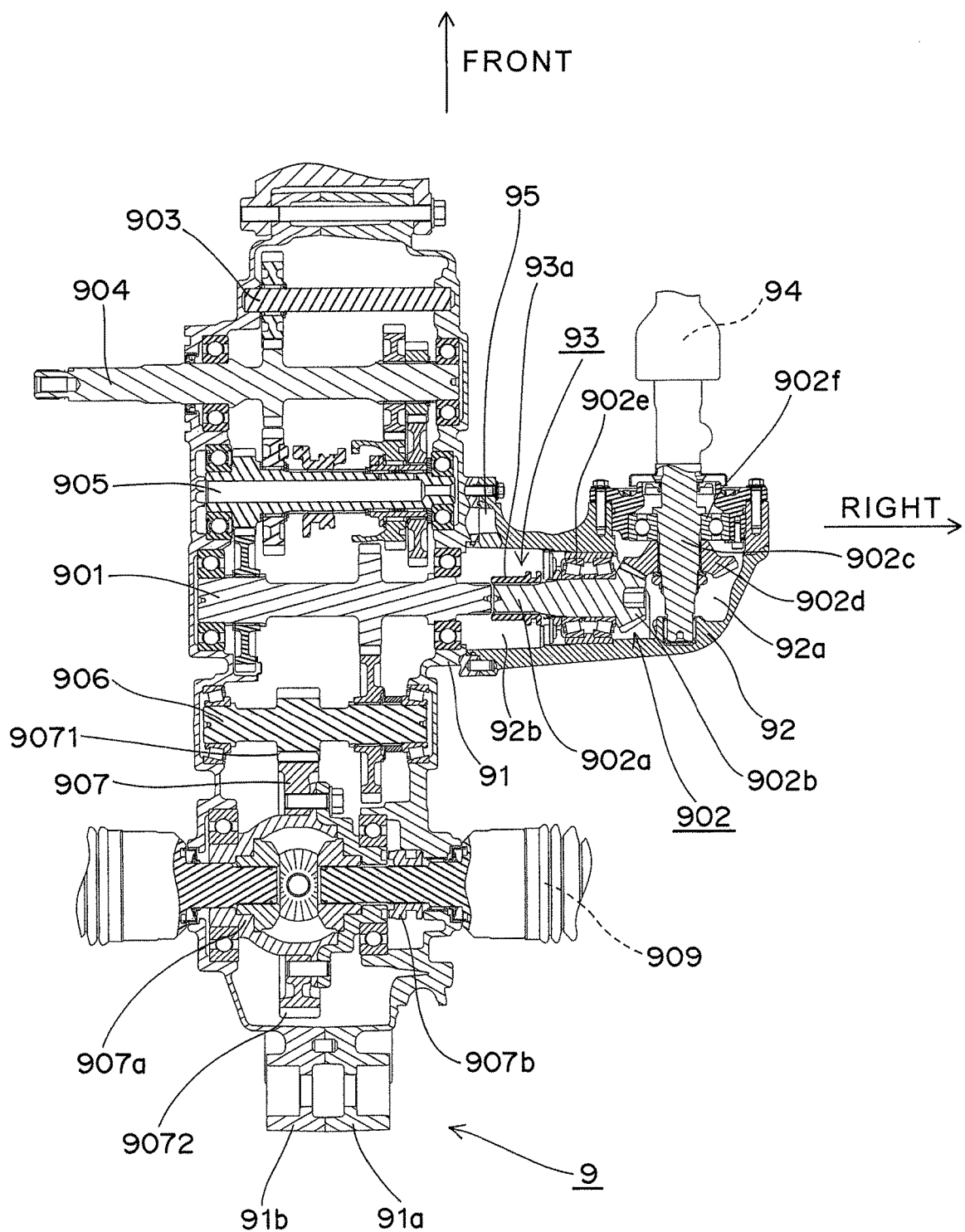
FIG. 4 is a cross sectional development view taken along a line passing individual shafts of a transmission.

FIG. 4 is a cross sectional development view taken along a line passing individual shafts of the transmission 9. The transmission 9 includes: the transmission case 91 accommodating a transmission mechanism; and a power extraction case 92 linked to the side wall of the transmission case 91 and accommodating a gear type power extraction mechanism 902 linked to a power extraction shaft 901 of the transmission mechanism. The power extraction case 92 includes: a gear accommodation chamber 92a for accommodating the gear type power extraction mechanism 902; and an intermediate transmission chamber 92b for establishing fluid communication between the gear accommodation chamber 92a and the inside of the transmission case 91. In the inside of the transmission 9, in the order from front to rear, provided are: an input shaft 904 for receiving a driving force from the engine 8 (FIG. 2); a counter shaft 905 for transmitting the driving force of the input shaft 904 to the power extraction shaft 901; the power extraction shaft 901; a rear-wheel intermediate shaft 906 for transmitting the driving force of the power extraction shaft 901; and a final slow-down mechanism 907 for finally slowing down the driving force of the rear-wheel intermediate shaft 906 and then transmitting the obtained driving force to a rear axle 909. Further, in a lower part between the input shaft 904 and the counter shaft 905, a reverse idler shaft 903 is arranged for reversing the revolution direction. Here, FIG. 4 shows the reverse idler shaft 903 in a state of being developed in the frontward of the input shaft 904. A driven pulley (not shown) of the belt converter (FIG. 2) is attached to the input shaft 904. Then, the driving force from the engine 8 (FIG. 2) is inputted to the input shaft 904 through a V-belt wound around between the driven pulley and a drive pulley (not shown) attached to the output shaft of the engine 8 (FIG. 2).

The final slow-down mechanism 907 includes a pinion 9071, a chain sprocket 9072, a differential mechanism 907a, and a differential locking mechanism 907b. Then, the driving force transmitted from the rear-wheel intermediate shaft 906 is transmitted and distributed to the right and left rear wheels 3 (FIG. 2) by the differential mechanism 907a. The differential locking mechanism 907b controls the fixing and release of the differential mechanism 907a. Then, when the differential locking mechanism 907b fixes the differential mechanism 907a, the differential of the right and left rear wheels 3 (FIG. 2) is fixed.

In the intermediate transmission chamber 92b, a switching mechanism 93 is arranged for switching, between a connected state and a disconnected state, power transmission between the power extraction shaft 901 and the gear type power extraction mechanism 902. The gear type power extraction mechanism 902 includes a bevel gear mechanism and includes: a first bevel gear 902b provided with a first shaft 902a on the input side; and a second bevel gear 902d provided with a second shaft 902c on the output side. As shown in FIG. 4, the power extraction shaft 901, the counter shaft 905, the rear-wheel intermediate shaft 906, and the first shaft 902a all have parallel longitudinal axes (i.e., all of these shafts are arranged parallel to each other). The switching mechanism 93 includes: a switching sleeve 93a spline-fit onto the power extraction shaft 901 and the first shaft 902a in a slidable manner in the axial direction; and an actuator (not shown) for causing the switching sleeve 93a to move in the axial direction. The actuator is caused to electrically operate by a changeover switch (not shown) provided near the driver's seat. When the actuator operates, the switching sleeve 93a is moved in the axial direction so that the power extraction shaft 901 and the first shaft 902a are brought into a connected state or a disconnected state. Further, the first shaft 902a is supported in a revolvable manner in the power extraction case 92 by the tapered roller bearing 902e of two-row construction. The second shaft 902c is supported in a revolvable manner in the outlet part of the power extraction case 92 by a ball bearing 902f. The tapered roller bearing 902e is arranged between the gear accommodation chamber 92a and the intermediate transmission chamber 92b.

A front-wheel propeller shaft 94 for driving the front wheels (FIG. 2) is linked to the front end of the second shaft 902c on the output side, and extends frontward. The front-wheel propeller shaft 94 is constructed from a plurality of propeller shaft members linked to each other with joints. The driving force of the first shaft 902a is transmitted through the bevel gear 902b and the bevel gear 902d to the front-wheel propeller shaft 94. As a result, the driving force of the front-wheel propeller shaft 94 is transmitted to the front axle so that the front wheels (FIG. 2) are revolved. Thus, in the present embodiment, the switching mechanism 93 switches whether the driving force is transmitted or not transmitted to the front wheels (FIG. 2), and hence corresponds to the two-wheel drive to four-wheel drive switching mechanism.

Switching between two-wheel drive and four-wheel drive is described below. In a two-wheel drive mode that the driving force of the engine 8 is not transmitted to the front wheels 2, when the driver pushes the changeover switch provided near the driver's seat, the actuator operates so as to move the switching sleeve 93a in the axial direction (leftward). As a result, the power extraction shaft 901 and the first shaft 902a are linked to each other through the switching sleeve 93a so that the driving force of the power extraction shaft 901 is transmitted to the first shaft 902a. Then, the driving force of the first shaft 902a is transmitted through the bevel gear 902b and the bevel gear 902d to the front-wheel propeller shaft 94. Then, the driving force of the front-wheel propeller shaft 94 is transmitted to the front axle so that the front wheels 2 (FIGS. 1 and 2) are revolved. As a result, the driving force of the engine 8 is transmitted to the front wheels 2 and the rear wheels 3 (FIGS. 1 and 2) and hence the utility vehicle 1 is operated in a four-wheel drive mode.

In the four-wheel drive mode that the driving force of the engine 8 is transmitted to the front wheels 2, when the driver pushes the changeover switch provided near the driver's seat, the actuator operates so as to move the switching sleeve 93a in the axial direction (rightward). As a result, connection between the power extraction shaft 901 and the first shaft 902a is released and hence the driving force of the power extraction shaft 901 is not transmitted to the first shaft 902a. As a result, the driving force of the engine 8 is transmitted to the rear wheels 3 alone and hence the utility vehicle 1 is operated in the two-wheel drive mode.

Figure 5:
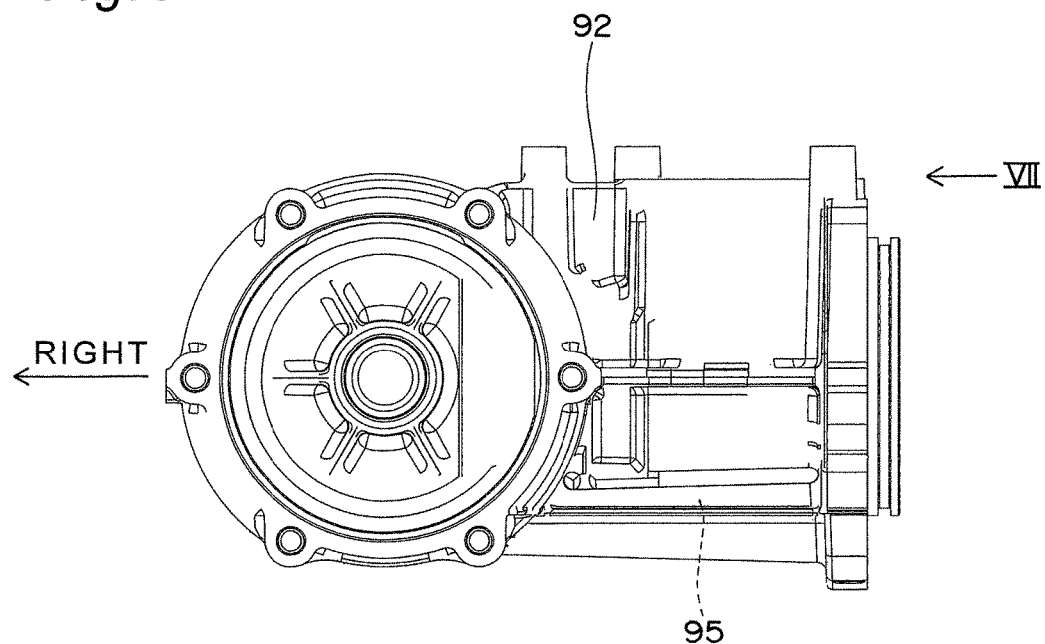
FIG. 5 is a front view of a power extraction case.
Figure 6:
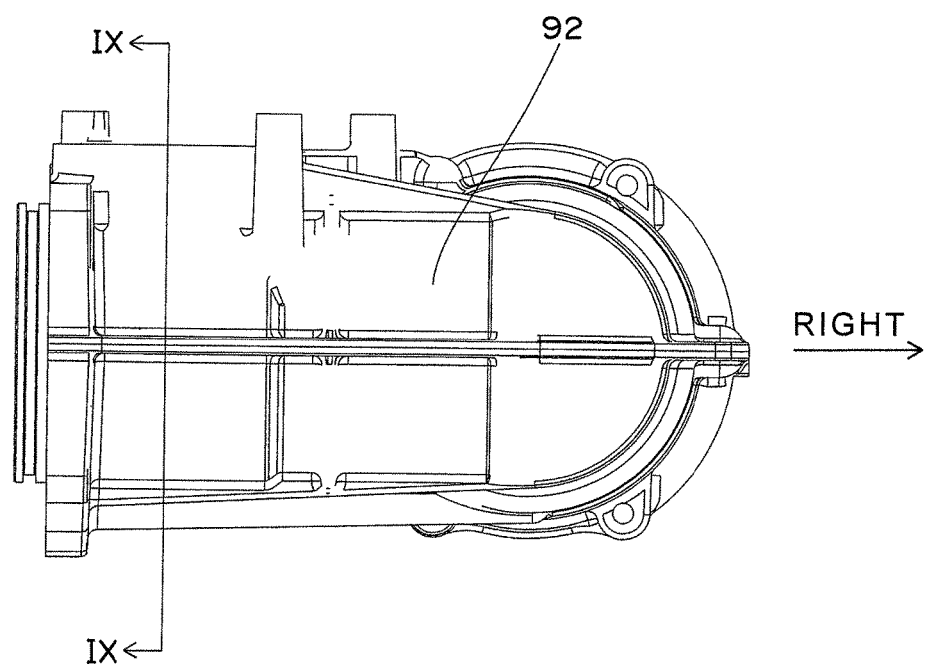
FIG. 6 is a rear view of a power extraction case.
Figure 7:
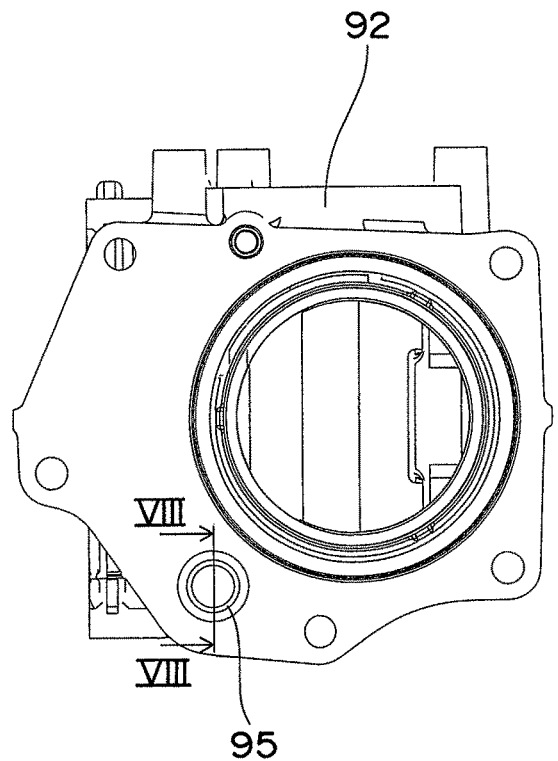
FIG. 7 is a view from the direction of arrow VII in FIG. 5.
Figure 8:
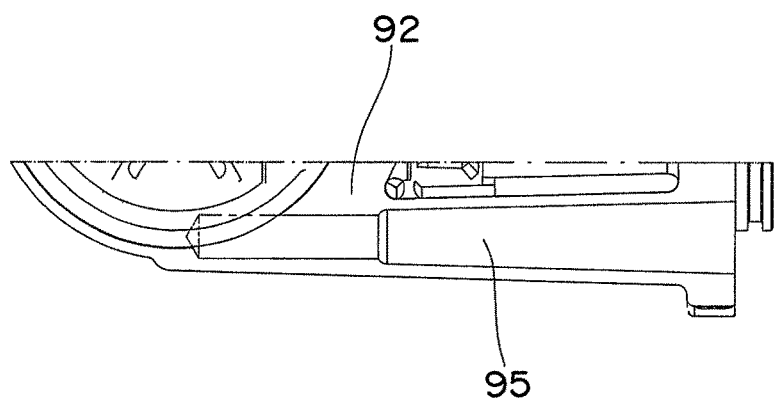
FIG. 8 is a sectional view taken along line VIII-VIII in FIG. 7.
Figure 9:
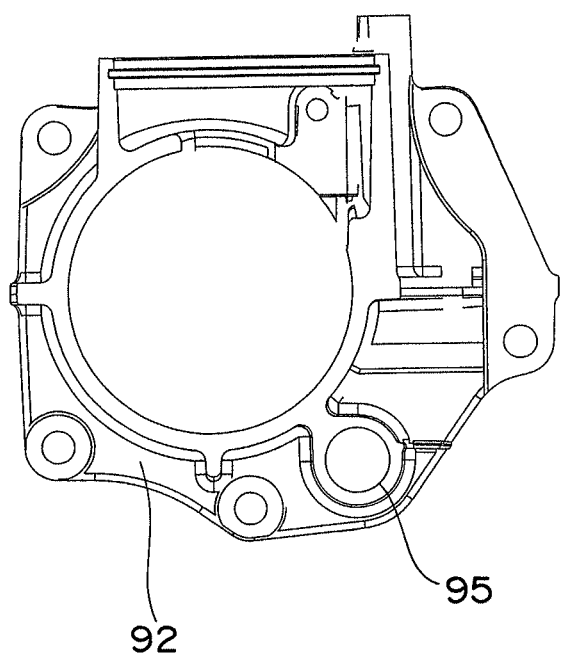
FIG. 9 is a sectional view taken along line IX-IX in FIG. 6.

FIG. 5 is a front view of the power extraction case 92. FIG. 6 is a rear view of the power extraction case 92. FIG. 7 is a view from the direction of arrow VII in FIG. 5. FIG. 8 is sectional view taken along line VIII-VIII in FIG. 7. FIG. 9 is a sectional view taken along line IX-IX in FIG. 6. As shown in FIGS. 4 and 5, separately from the intermediate transmission chamber 92b, the power extraction case 92 is provided with an oil communication passage 95 for establishing fluid communication between the gear accommodation chamber 92a and the inside of the transmission case 91. Thus, the oil in the inside of the transmission case 91 is supplied to the bevel gear mechanism serving as the gear type power extraction mechanism 902 not only through the intermediate transmission chamber 92b but also through the oil communication passage 95. Further, as shown in FIGS. 5 and 8, the oil communication passage 95 is formed in the power extraction case 92 (also shown in FIGS. 7 and 9). Specifically, the formation wall of the oil communication passage 95 is fabricated by integral molding with the formation wall of the power extraction case 92, and extends parallel to the power extraction shaft 901 (see FIGS. 4, 5, 7, and 8). The oil communication passage 95 is a passage through which oil passes. Thus, the oil communication passage 95 is not provided with an oil-passage interfering member like the tapered roller bearing 902e of the first shaft 902a arranged between the gear accommodation chamber 92a and the intermediate transmission chamber 92b. As shown in FIGS. 5 and 8, the oil communication passage 95 has a cylindrical shape.

Figure 10:
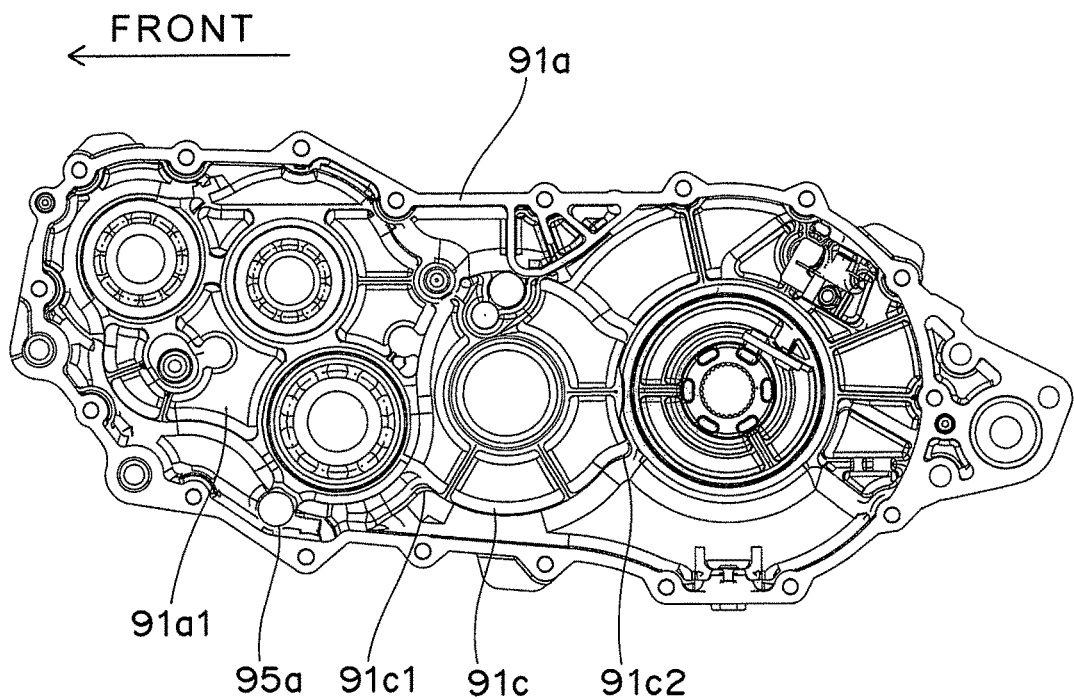
FIG. 10 is a side view of a transmission case 91a viewed from the inside.
Figure 11:
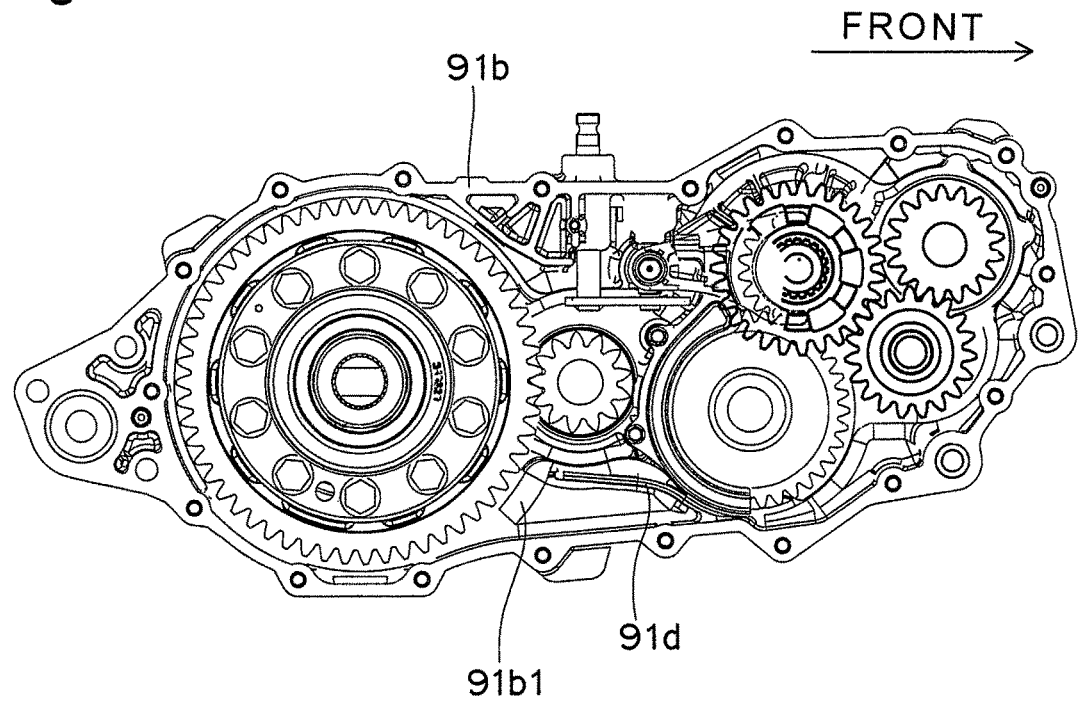
FIG. 11 is a side view of a transmission case 91b viewed from the inside.
Figure 12:
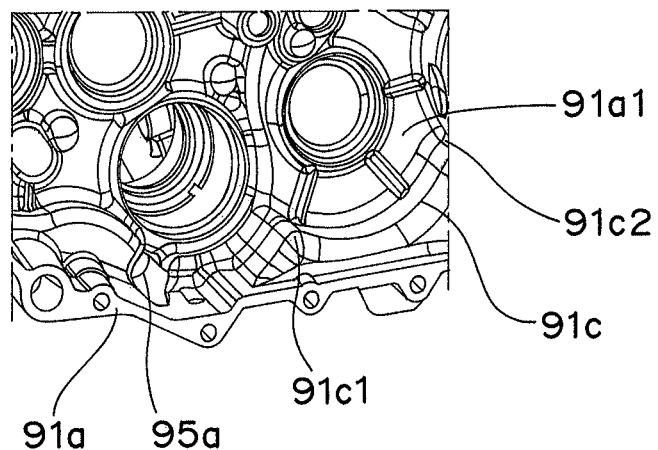
FIG. 12 is a partial perspective view of FIG. 10.
Figure 13:
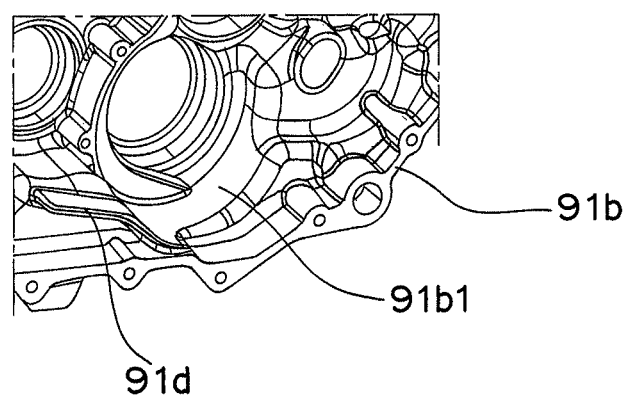
FIG. 13 is a partial perspective view of FIG. 11.

FIG. 10 is a side view of the transmission case 91a viewed from the inside. FIG. 11 is a side view of the transmission case 91b viewed from the inside. FIG. 12 is a partial perspective view of FIG. 10. FIG. 13 is a partial perspective view of FIG. 11. As shown in FIGS. 10 and 12, a recess 91c protruding inward from the inner wall 91a1 is formed in the inner wall 91a1 of the transmission case 91a. Further, in the transmission case 91a, an opening part 95a of the oil communication passage 95 is formed. The opening part 95a is provided in the bottom part of the front part in the inside of the transmission case 91. As shown in FIGS. 11 and 13, a rib 91d protruding inward from the inner wall 91b1 is formed in the inner wall 91b1 of the transmission case 91b. Then, the recess 91c and the rib 91d form an oil passage in the inside of the transmission case 91. The recess 91c and the rib 91d are formed such that their rear parts are higher than their front parts. Then, the oil passage formed by the recess 91c and the rib 91d guides oil to the opening part 95a provided in the front part in the inside of the transmission case. Here, the rib 91d is formed such that the height gradually increases from the front end part to the rear end part. On the other hand, the recess 91c formed such that the middle part between the front part and the rear part warps downward and that the maximum height 91c2 in the rear part is higher than the maximum height 91c1 in the front part.

According to the utility vehicle 1 having the above-mentioned configuration, the following effects are obtained.

(1) The power extraction case 92 is provided with the oil communication passage 95 for establishing fluid communication between the inside of the transmission case 91 and the gear accommodation chamber 92a. Thus, oil can easily be supplied through the oil communication passage 95 to the gear type power extraction mechanism 902 in the gear accommodation chamber 92a. Further, the oil communication passage is provided separately from the intermediate transmission chamber 92b for establishing fluid communication between the inside of the transmission case 91 and the gear accommodation chamber 92a. Thus, oil can easily be supplied to the gear type power extraction mechanism 902 in the gear accommodation chamber 92b.

(2) The oil communication passage 95 is formed in the power extraction case 92. Thus, the oil communication passage 95 can easily be formed.

(3) Between the gear accommodation chamber 92a and the intermediate transmission chamber 92b, the tapered roller bearing 902e is arranged for supporting the first shaft 902a of the gear type power extraction mechanism 902. Thus, even when oil supply from the intermediate transmission chamber 92b to the gear accommodation chamber 92a interfered by the tapered roller bearing 902e, oil can easily be supplied through the oil communication passage 95 to the gear type power extraction mechanism 902 in the gear accommodation chamber 92a.

(4) Oil can easily be supplied to the bevel gear mechanism serving as the gear type power extraction mechanism 902.

(5) In the intermediate transmission chamber 92b, the switching mechanism 93 is arranged for switching, between a connected state and a disconnected state, power transmission between the power extraction shaft 901 and the gear type power extraction mechanism 902. Then, the switching mechanism 93 can switch power transmission from the power extraction shaft 901.

(6) The switching mechanism 93 is provided for switching connection or non-connection between the power extraction shaft 901 and the front-wheel propeller shaft 94 for driving the front wheels 2. Thus, switching between two-wheel drive and four-wheel drive of the utility vehicle 1 is achieved.

(7) The oil passage in the inside of the transmission case 91 can easily be formed by the recess 91c and the rib 91d in the inner walls 91a1 and 91b1 of the transmission cases 91a and 91b. Further, the oil in the inside of the transmission case 91 can be led to the oil communication passage 95 so that the oil in the inside of the transmission case 91 can easily be supplied through the oil communication passage 95 to the gear type power extraction mechanism 902 in the gear accommodation chamber 92a.

(8) At the time of acceleration of the vehicle, oil is to move from the front part to the rear part owing to the acceleration. However, since the recess 91c and the rib 91d are formed such that their rear parts are higher than their front parts, the recess 91c and the rib 91d can suppress the rearward movement of the oil. As a result, even at the time of acceleration of the vehicle, the oil can easily stay in the opening part 95a of the oil communication passage 95.

(9) The final slow-down mechanism 907 is provided with the differential locking mechanism 907b. Then, the differential locking mechanism 907b can fix the differential of the rear wheels 3 so as to avoid useless revolution.

(10) The engine 8 and the transmission 9 are formed separately from each other. Then, the reverse idler shaft 903, the input shaft 904, the counter shaft 905, the power extraction shaft 901, the rear-wheel intermediate shaft 906, and the final slow-down mechanism 907 are accommodated in the transmission case 91. Thus, the above-mentioned individual shafts and the final slow-down mechanism 907 can be arranged compact.

(11) The power transmission path between the power extraction shaft 901 and the final slow-down mechanism 907 is provided with the rear-wheel intermediate shaft 906. Thus, the gear diameters in the gear group provided in the power extraction shaft 901 and the gear diameters in the gear group provided in the rear-wheel intermediate shaft 906 can be reduced in a state that a predetermined shaft-to-shaft distance is ensured between the power extraction shaft 901 and the rear axle 909. This avoids size increase in the transmission 9.

In the above-mentioned embodiment, the oil communication passage 95 has been provided separately from the intermediate transmission chamber 92b. However, the oil communication passage may be provided in an integrated manner with the intermediate transmission chamber.

In the above-mentioned embodiment, the formation wall of the oil communication passage 95 has been fabricated by integral molding with the formation wall of the power extraction case 92. However, the oil communication passage may be formed simply in the power extraction case, or alternatively may be formed separately from the power extraction case and then attached to the inner wall of the power extraction case.

In the above-mentioned embodiment, the front sheet 11 and the rear sheet 12 are of bench type. Instead, a box type may be employed.

In the above-mentioned embodiment, the counter shaft 905 has been provided in a singular number. Instead, a plurality of counter shafts may be provided. Alternatively, a counter shaft may be not provided and then the input shaft 904 and the power extraction shaft 901 may be linked to each other through a drive belt.

In the above-mentioned embodiment, the final slow-down mechanism 907 is provided with the differential mechanism 907a and the differential locking mechanism 907b. Then, the front axle also may be provided with a differential mechanism and a differential locking mechanism.

Various modifications and changes may be made without departing from the spirit and the scope of the present invention described in the claims.

The invention claimed is:

1. A vehicle-use transmission comprising:
a transmission case accommodating a transmission mechanism; and
a power extraction case linked to a side wall of the transmission case and accommodating a gear type power extraction mechanism linked to a power extraction shaft of the transmission mechanism, the power extraction shaft of the transmission mechanism being arranged inside the transmission case between (i) a counter shaft for transmitting a driving force of an input shaft to the power extraction shaft and (ii) a rear-wheel intermediate shaft for transmitting a driving force of the power extraction shaft,
wherein the power extraction case includes:
a gear accommodation chamber for accommodating the gear type power extraction mechanism; and
an intermediate transmission chamber for establishing fluid communication between the gear accommodation chamber and an inside of the transmission case,
wherein the gear type power extraction mechanism includes:
a first shaft extending from the power extraction shaft of the transmission mechanism and linked to the power extraction shaft, the first shaft being supported by a tapered roller bearing arranged between the gear accommodation chamber and the intermediate transmission chamber, and
a second shaft extending in a direction perpendicular to the first shaft, and
wherein the power extraction case is provided with an oil communication passage for establishing fluid communication between the inside of the transmission case and the gear accommodation chamber separately from the intermediate transmission chamber, the oil communication passage extending parallel to the power extraction shaft and to the first shaft of the gear type power extraction mechanism, and
wherein the power extraction shaft, the counter shaft, the rear-wheel intermediate shaft, and the first shaft have parallel longitudinal axes.

2. The transmission according to claim 1, wherein the oil communication passage is formed in the power extraction case.

3. The transmission according to claim 1, wherein the gear type power extraction mechanism includes a power-up-stream-side gear shaft having a bearing arranged between the gear accommodation chamber and the intermediate transmission chamber.

4. The transmission according to claim 1, wherein the gear type power extraction mechanism includes a bevel gear mechanism.

5. The transmission according to claim 1, wherein a switching mechanism is arranged in the intermediate transmission chamber for switching power transmission between the power extraction shaft and the gear type power extraction mechanism between a connected state and a disconnected state.

6. The transmission according to claim 5, wherein the switching mechanism includes a two-wheel drive to four-wheel drive switching mechanism.

7. The transmission according to claim 1, wherein in the inside of the transmission case, an oil passage is constructed from: a recess formed in an inner wall of the transmission case; and a rib protruding from the inner wall of the transmission case, and the oil passage is configured to guide oil to an opening part of the oil communication passage in the inside of the transmission case.

8. The transmission according to claim 7, wherein the opening part of the oil communication passage is provided in a bottom part of a front part in the inside of the transmission case, and the recess and the rib are formed such that rear parts thereof are higher than front parts thereof.

* * * * *